US009204382B1

(12) United States Patent
Gude et al.

(10) Patent No.: US 9,204,382 B1
(45) Date of Patent: Dec. 1, 2015

(54) SYSTEMS AND METHODS FOR USING A CHANNEL ACCESS SCHEME OF A FIRST NETWORK TO SYNCHRONIZE WITH A SECOND NETWORK DURING AN ACTIVE CALL ON A MULTI-SIM DEVICE

(71) Applicant: QUALCOMM Incorporated, San Diego, CA (US)

(72) Inventors: Venkata Siva Prasad Rao Gude, San Diego, CA (US); Debesh Kumar Sahu, Hyderabad (IN); Bhaskara Viswanadham Batchu, Hyderabad (IN); Arun Kumar Sharma Tandra, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 14/273,614

(22) Filed: May 9, 2014

(51) Int. Cl.
H04W 4/00 (2009.01)
H04W 48/18 (2009.01)
H04W 88/06 (2009.01)

(52) U.S. Cl.
CPC ............. *H04W 48/18* (2013.01); *H04W 88/06* (2013.01)

(58) Field of Classification Search
CPC .............................. H04W 48/18; H04W 88/06
USPC .......................................... 455/434; 370/338
See application file for complete search history.

(56) References Cited

U.S. PATENT DOCUMENTS

| 4,383,315 A | 5/1983 | Torng |
| 6,567,396 B1 | 5/2003 | Pohjanvouri et al. |
| 8,570,951 B1 | 10/2013 | Rajurkar et al. |
| 2011/0117962 A1* | 5/2011 | Qiu ........................ H04W 48/18 455/558 |
| 2012/0051285 A1 | 3/2012 | Hou |
| 2012/0135729 A1 | 5/2012 | Chiou et al. |
| 2012/0190362 A1 | 7/2012 | Subbarayudu et al. |
| 2013/0189985 A1 | 7/2013 | Mutya et al. |
| 2013/0303181 A1 | 11/2013 | Rajurkar et al. |
| 2013/0303203 A1* | 11/2013 | Wang .................... H04W 68/00 455/458 |
| 2014/0120925 A1 | 5/2014 | Kanthala et al. |

FOREIGN PATENT DOCUMENTS

WO 2012089596 A1 7/2012

OTHER PUBLICATIONS

International Search Report and Written Opinion—PCT/US2015/024952—ISA/EPO—Jul. 23, 2015.

* cited by examiner

*Primary Examiner* — Marcos Batista
(74) *Attorney, Agent, or Firm* — The Marbury Law Group, PLLC

(57) ABSTRACT

Embodiment methods and devices enable use of a shared radio resource on a multi-SIM wireless communication device to maintain session information on a service associated with one SIM during unused time slots of an active communication session associated with another SIM. During the session, a processor may calculate radio idle time periods in the active communication session, determine whether any of the radio idle time periods will exceed a predetermined threshold duration, and retune the shared radio resource to receive search samples on a frequency of the non-active network during radio idle time periods that exceed the predetermined threshold duration. Search samples may be stored for processing between radio idle time periods in order to maintain session information on a service associated with one SIM and provide service information to applications executing on the device during the active communication session.

28 Claims, 7 Drawing Sheets

SYSTEMS AND METHODS FOR USING A CHANNEL ACCESS SCHEME OF A FIRST NETWORK TO SYNCHRONIZE WITH A SECOND NETWORK DURING AN ACTIVE CALL ON A MULTI-SIM DEVICE

BACKGROUND

Multi-SIM (subscriber identification module) wireless devices have become increasing popular because of the versatility that they provide, particularly in countries where there are many service providers. For example, dual-SIM wireless devices may allow a user to implement two different plans or service providers, with separate numbers and bills, on the same device (e.g., business account and personal account). Also, during travel, users can obtain local (SIM) cards and pay local call rates in the destination country. By using multiple SIMs, a user may take advantage of different pricing plans and save on mobile data usage.

In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc.

One type of multi-SIM wireless device, referred to as a dual-SIM dual active (DSDA) device, allows simultaneous active connections with the networks corresponding to two SIMs using separate transmit/receive chains associated with each SIM. Such separate components may provide convenience to a user, but may require high power consumption during operation. Another type of multi-SIM wireless device, referred to as a dual-SIM dual standby (DSDS) device, typically provides for a "standby" mode (i.e., idle mode) in which services associated with either SIM may originate or terminate a communication (e.g., a voice call or data call), and in which services associated with both SIMs may receive pages using a shared radio resource. By sharing a radio resource between the services enabled by both SIMs, a DSDS device may allow for a longer battery life than that of a DSDA device, as well as other benefits (e.g., lower cost of the device, avoiding receiver desense from co-located radios, etc.).

However, a disadvantage of sharing a radio resource between multiple SIMs on the same device is that when an active communication is started on a network associated with one of the SIMs, it occupies use of the radio resource, thereby terminating standby mode on the device. That is, during an active communication session on the network associated with a first SIM, the wireless device may enter an out-of-service state on a network associated with a second SIM. When the active communication session ends, the device must perform initial system and network acquisition steps in order to re-enter idle mode on the network associated with the second SIM, requiring additional time and use of the radio resource. Further, due to the out-of-service state, the wireless device may be unable to make use of any supplemental services enabled by the network associated with the second SIM during the active communication session.

SUMMARY

Systems, methods, and devices of various embodiments enable a wireless communication device to manage use of a shared radio resource for maintaining synchronization of networks supported by at least a first and a second SIM by detecting an active communication session on a modem stack associated with the first SIM in which at least one time slot of a channel is allocated to the active communication session by a network associated with the first SIM, determining whether a condition exists to trigger a search for signals in a network associated with the second SIM, calculating radio idle time periods in response to determining that a condition exists to trigger the search for signals in the network associated with the second SIM, and determining whether at least one radio idle time period will exceed a predetermined threshold duration. Embodiment methods may also include, in response to determining that at least one radio idle time period will exceed the predetermined threshold duration tuning the radio resource to a frequency of the network associated with the second SIM upon initiation of the at least one radio idle time period, receiving at least one search sample comprising signals transmitted by the second network, storing the at least one search sample, and tuning the radio resource to a frequency corresponding to the active communication session on the modem stack associated with the first SIM upon expiration of the at least one radio idle time period.

Embodiment systems, methods and devices may also include performing offline processing on the at least one search sample after expiration of the radio idle time period by identifying pilot signals in the at least one stored search sample based on phase comparison with possible pseudo-noise (PN) offsets and resulting signal energy measurements, selecting a PN offset resulting in a strong signal energy, decoding a message from the stored search sample using the selected PN offset, channel message using the selected PN offset in which the sync channel message includes system information and system time reported by the network associated with the second SIM, synchronizing to the system time of the network associated with the second SIM, and maintaining the system information.

In some embodiment systems, methods and devices, performing offline processing may further include determining whether a request for information has been received from a position location system in the wireless device, providing the system time of the network associated with the second SIM to the position location system in response to determining that a request for information has been received from the position location system, determining whether an assisted mode has been activated by the position location system, and providing assistance data to the position location system in response to determining that the assisted mode has been activated.

In some embodiment systems, methods and devices, the condition that triggers the search for the network associated with the second SIM includes one or more of occurrence of a time slot in which the modem stack associated with the second SIM is configured to wake up from idle mode to monitor a paging channel of the network associated with the second SIM, receipt of a request for information from a position location system of the wireless device, and notification that an assisted mode has been activated by the position location system.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
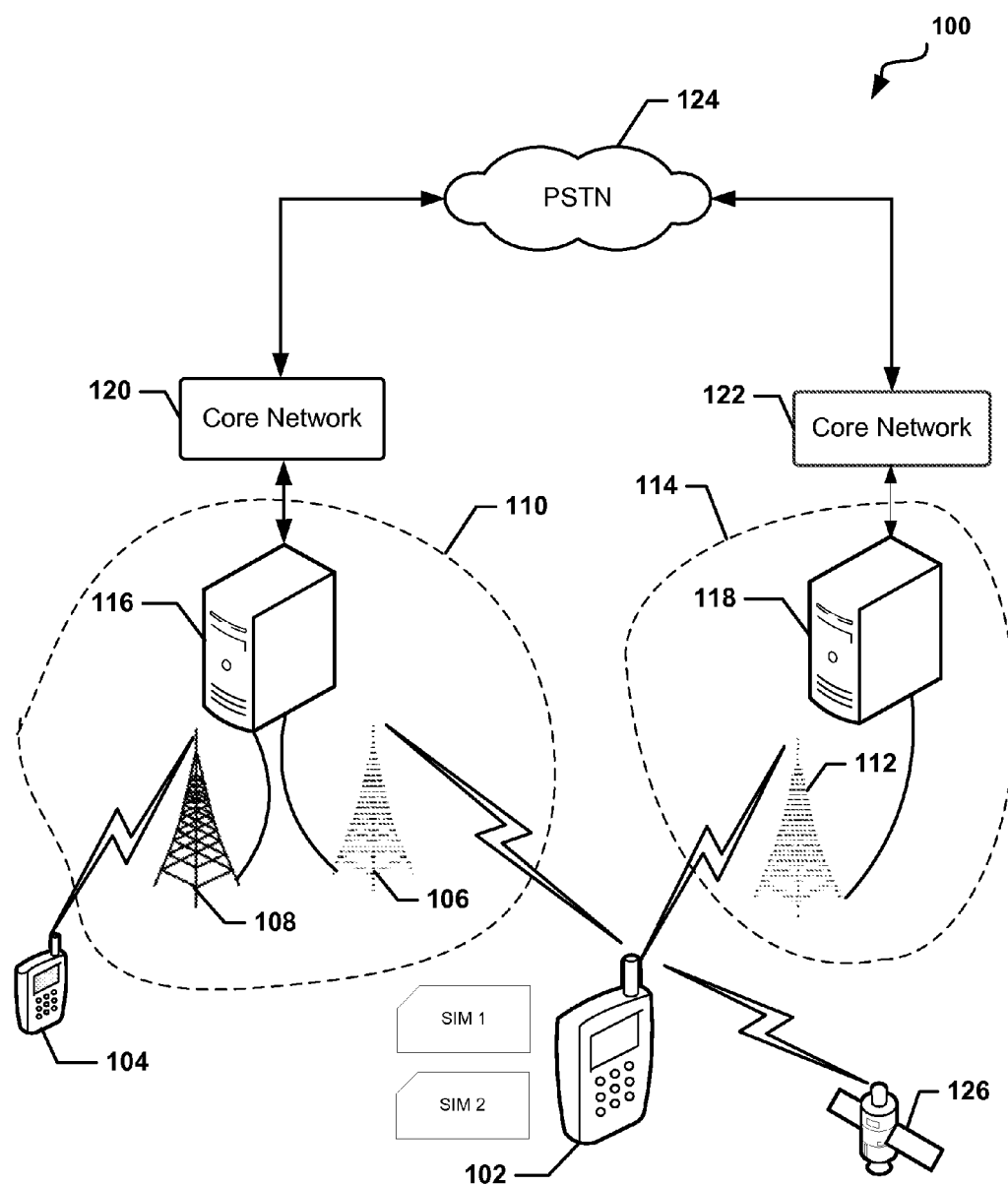
FIG. 1 is a communication system block diagram of a network suitable for use with various embodiments of the disclosure.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

In various embodiments, a multi-SIM device in which a radio resource is shared may take advantage of a channel access method implemented by a network associated with a first SIM, on which the multi-SIM device is engaged in an active communication, to synchronize with and/or receive location information from a network associated with another SIM.

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM. For example, references to assigning a radio resource to a SIM (or granting a SIM radio access) means that the radio resource has been allocated to establishing or using a communication service with a particular network that is enabled by the information stored in that SIM.

As used herein, the terms "multi-SIM wireless communication device," "multi-SIM wireless device," "dual-SIM wireless communication device," "dual-SIM dual standby device," and "DSDS device" are used interchangeably to describe a wireless device that is configured with more than one SIM and is capable of independently handling communications with networks of all subscriptions by sharing a radio resource.

As used herein, the terms "network," "wireless network," "cellular network," "public land mobile network (PLMN)," and "system" are used interchangeably to describe a wireless network of a carrier associated with a wireless device and/or subscription on a wireless device, and/or its roaming partners.

As used herein, the terms "pilot signal," "pilot channel," "BCCH carrier," and "carrier frequency" are used interchangeably to describe a base frequency signal which a network broadcasts from a base transceiver station (BTS), radio base station (RBS), or node B in order to advertise its presence, operator identity, and other necessary initial information.

The term "acquisition" when used herein with respect to a network or system refers to any of a variety of procedures in which a wireless device may scan for BCCH carriers or pilot channels, measure signal strength associated with BCCH carriers or pilot channels, using BCCH carriers or pilot channels to receive and decode system information in order to obtain service from the network system. While reference may be made to acquisition procedures set forth in GSM or CDMA standards, they are provided merely as examples, and the claims apply to other types of cellular telecommunication networks and technologies.

Wireless communication networks are widely deployed to provide various communication services such as voice, packet data, broadcast, messaging, and so on. These wireless networks may be capable of supporting communications for multiple users by sharing the available network resources. Examples of such wireless networks include the Global System for Mobile Communications (GSM), Code Division Multiple Access (CDMA) networks, Time Division Multiple Access (TDMA) networks, and Frequency Division Multiple Access (FDMA) networks. Wireless networks may also utilize various radio technologies such as Wideband-CDMA (W-CDMA), cdma2000, Global System for Mobile Communications (GSM), etc.

In current mobile communications, wireless service carriers have standardized a number of techniques for selecting wireless communication systems and obtaining service therefrom, in accordance with preferences of the subscriber's service provider/carrier. Service providers generally enable subscribers to access a network by providing provisioning information to subscriber devices. For clarity, the embodiments are described below for GSM-type and/or CDMA-type networks, but may be applied to networks using any other radio technology or protocol.

Wireless service carriers/service providers may establish public land mobile networks (PLMNs) to provide communication services to the public. Each PLMN may support cells that use one or many different multiple-access wireless communication protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology). An example GSM network may operate on any of a number of GSM bands (e.g., GSM 900, GSM 850, etc.), each of which cover multiple radio frequency (RF) channels identified in 3GPP TS 05.05, entitled "Digital cellular telecommunications system (Phase 2+); Radio transmission and reception (Release 1999)." Further, each GSM network typically operates on a specific set of RF channels in a specific GSM band. In describing various embodiments, the terms "channel," and "frequency" may be used interchangeably and may refer to channels in GSM bands, and/or channels in other network bands.

A multi-SIM wireless device in which two or more SIMs (and their associated protocol stacks) share use of a single radio resource may be configured to operate in "standby mode." For example, in dual-standby mode on a DSDS device, the communication services enabled by each SIM may both enter idle mode, but while a communication service enabled by one SIM is transmitting or receiving data, the communication service enabled by the other SIM may be unavailable for use. Other multi-SIM wireless communication devices may be configured to operate more than two SIMs in standby mode, thereby sharing a radio resource among at least three SIMs. The SIMs in a multi-SIM wireless communication device may be associated with the same or different networks. Each SIM may generally be provisioned by a service provider with a predetermined list of preferred PLMNs (also called a preferred roaming list (PRL)) from which the wireless device may receive service (i.e., a home PLMN and roaming partner PLMNs).

Although multi-SIM wireless communication devices offer a variety of options to the end user, they also necessitate efficient execution of complex tasks. In particular, DSDS wireless devices generally have separate modem stacks, each associated with a SIM, that share a single radio. Sharing a single radio means that when one modem stack is involved in an active communication the other modem stack is denied radio access, leaving it temporarily out of service.

Upon being powered on and/or recovering from a radio-off condition, a conventional wireless device may begin service acquisition functions to connect to a network. In particular, to obtain service in a GSM network, a conventional wireless device may identify available cells in its vicinity by using the shared radio to scan the channels in a list of previously-acquired Broadcast Control Channel (BCCH) carriers to find channels on which service may be established. As part of scanning channels of the BCCH carriers, the shared radio may measure the signal strength on each supported frequency band (i.e., channels on which service may be acquired), and identify those channels that are above a threshold signal strength (i.e., a signal strength sufficient to enable reliable communications) as being potential BCCH carriers. Upon detecting the channels of potential BCCH carriers, the wireless device shared radio typically tunes to the carrier frequency exhibiting most favorable signal conditions and/or satisfying some other selection criteria. On this frequency, the wireless device may read a Synchronization Channel (SCH) to obtain a base station identity code (BSIC), followed by reading the BCCH to obtain system information (e.g., a PLMN identifier).

To obtain service in a GSM network, a conventional wireless device may also select a desired PLMN based on a preferred PLMN list (i.e., automatic mode) stored in a SIM or by being presented with a list containing all networks found from the PLMN identifiers obtained on BCCH carrier frequencies, and may select one from the list stored in the SIM (i.e., manual mode). A conventional wireless device may attempt to find a suitable cell for camping on by passing through the list in descending order of received signal strength, and selecting the first BCCH carrier frequency which satisfies a set of requirements (e.g., that the cell is part of the selected PLMN, not barred by the service provider, etc.).

Once camped on a cell of a selected network, a conventional wireless device may attempt to register its presence in the selected network using subscriber information stored in the SIM to obtain service in the GSM network. For example, to register for service in the CS domain of a GSM network, the wireless device may perform an IMSI attach procedure, as set forth in GSM standards.

On a conventional wireless device, the operations of identifying potential BCCH carriers, selecting a carrier, camping on a cell of the selected network, registering for service with the network, and maintaining/monitoring a connection to that network may be accomplished while in the idle mode as part of GSM idle mode functionalities.

To obtain service from a CDMA system upon being powered on or recovering from an out-of-service or radio-off condition, a conventional wireless device may process the pilot and sync channels to acquire and synchronize with the CDMA system in the initialization state. Specifically, in an initialization state, the wireless device may select a system from which to obtain service, as well as channel within that system to search. The wireless device may utilize a prioritized list for channel selection.

A conventional wireless device may tune to a selected CDMA channel, and may search the pilot channel by setting a corresponding code (i.e., a short pseudorandom (PN) code). A search correlator of the device may sweep through possible PN offsets to identify base stations in the area. The wireless device may select the strongest pilot signal identified and establish the frequency and PN time reference i.e., base station identity. Using the short code PN code offset of the acquired pilot signal, the wireless device may decode a sync channel message on that frequency, which is spread with the PN code at the same PN offset as the pilot channel.

After receiving and processing the sync channel message, a conventional wireless device may synchronize its long-code timing and system timing to those of the CDMA system, and may store the system configuration and timing information. Specifically, the wireless device may store the system identification (SID), network identification (NID), pilot PN offset, system time, long code state, paging channel data rate, and offset of local time from system time, allowing the wireless device to synchronize its own time to system time.

As part of obtaining service from a CDMA network, the decoded sync channel message may provide information from which to derive a paging channel long code mask to be used to decode paging channel messages while in the idle state. A conventional wireless device in the idle state may monitor a paging channel and may process overhead messages on that channel. The overhead messages may be compared to stored sequence numbers to ensure that the wireless device has the most current parameters, and directed messages may be checked to determine the intended recipient.

These conventional processes for acquiring service are typically repeated for each SIM within a multi-SIM wireless communication device following an out-of-service condition in order to successfully register with networks and services enabled by the information stored on each SIM. This is because each SIM may be associated with separate modem stacks within the wireless device that enable communications with different networks while sharing the single radio resource.

In a common application of DSDS devices in which two or more SIMs share a common radio resource, one SIM may store the provisioning information to enable services on a GSM system and the other SIM may store the provisioning information to enable services on a CDMA system. In such a DSDS device, starting an active communication on the GSM system (i.e., using the shared radio to enable communications via the GSM service) requires placing the service on the CDMA system out-of-service. Although the GSM active communication involves using only two out of eight timeslots per TDMA frame, the radio resource conventionally is exclusively controlled by the SIM enabling the GSM service. As such, a conventional DSDS device will not attempt to regain service from the CDMA system until the GSM call has ended, at which time initial acquisition procedures outlined above must be performed. Performing the initial acquisition procedures may adversely impact the time required to regain CDMA service after the GSM call ends. Further the loss of connection with a CDMA system may impact services that use CDMA system information, such as location services.

Various embodiments provide methods for improving access to communication networks as well as other services on a wireless device in which multiple SIMs share a radio resource, such as a DSDS device. In particular, while a call is active on a first network (e.g., a GSM network) associated with a first SIM (e.g., a SIM enabling GSM service), during time slots of traffic channel frames that are not allocated to the first SIM, a second SIM (e.g., a SIM enabling CDMA service) may utilize the radio resource to capture data from a forward link channel associated with a second network with which service was established before the call became active. When the radio resource returns to the active communication call at the start of the next time slot for traffic channel frames allocated to the active call, the data captured from the forward link channel associated with the second network may be processed by the modem stack associated with the second SIM. In some embodiments, such processing may include extracting system information from multiple logical channels transmitted on the same frequency channel. Further, such processing may include performing measurements using the extracted system information and providing the measurements to modules associated with location services executing on the wireless device in response to a prompt from one or more of the location services. By temporarily "repurposing" the shared radio resource in this manner, the modem stack of the second SIM may avoid going out-of-service while an active call is supported by the first SIM despite not being able to receive incoming or initiate outgoing calls.

The various embodiments are applicable to wireless devices in which the first SIM enables a wireless service that allocates time slots to traffic channel frames, such as GSM, and the second SIM enables a wireless service that employ a forward link channel, such as CDMA, WCDMA, etc. In an example DSDS device, information stored on one SIM may enable access to GSM networks, while information stored on the other SIM may enable access to CDMA networks. For ease of reference, the embodiment descriptions refer to GSM and CDMA networks, services and protocols. However, these references are for illustration purposes only, and not intended to limit the scope of the claims to those types of networks unless specifically recited in a claim.

The time division multiple access (TDMA) scheme used in GSM networks to divide frequencies into individual physical channels leaves periods of time ("time slots") during which the frequency is not allocated to the modem stack of the first SIM, but rather to other devices with active calls on the same network and accessing the same frequency. In various embodiments, the wireless device may be configured to determine whether a duration of impending continuous unused time slots (i.e., gap of time between time slots allocated to the first SIM) will be longer than a predetermined time threshold, and if so, to retune the shared radio resource to perform a quick search during the gap of time between time slots allocated to the first SIM to find a strong CDMA pilot signal, and to use that pilot signal to obtain system information from on an associated CDMA frequency. The obtained information may then be processed by the modem stack associated with the CDMA SIM when the radio tunes back to the GSM network. In this manner, the wireless device can synchronize with the CDMA system and maintain system time during the GSM call, thereby avoiding the need to perform the service acquisition process once the GSM call ends. In some embodiments, the system information may be provided to applications running on the wireless device for use in other services. For example, system information may be provided to a position location system (e.g., a global positioning system (GPS) module), and used to facilitate receiving signals from GPS satellites and/or for alternative network-based location determinations.

FIG. 1 illustrates a wireless network system 100 suitable for use with various embodiments. Wireless devices 102, 104 may be configured to establish wireless connections with cell towers or base stations of one or more radio access networks. For example, the wireless devices 102, 104 may transmit/receive data using base stations 106, 108, which may be part of a network 110, as is known in the art. The wireless devices 102, 104 may further be configured to transmit/receive data through base station 112, which may be part of a different network 114.

The wireless networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, G-3, G-4, or other protocols that may be used in a wireless communication network or a data communication network. The networks 110, 114 may use the same or different wireless interfaces and/or physical layers. In some embodiments, the base stations 106, 108, 112 may be controlled by one or more base station controllers (BSC) 116, 118. For example, the base stations 106, 108, BSC 116, and other components may form the network 110, as is known in the art. Alternate network configurations may also be used and the embodiments are not limited to the configuration illustrated. For example, in some embodiments the functionality of the BSC 116 and at least one of the base stations 106, 108 may be collapsed into a single "hybrid" module having the functionality of these components.

In various embodiments, the wireless devices 102, 104 may access core networks 120, 122 after camping on cells managed by the base stations 106, 112. The wireless devices 102, 104 may also establish connections with Wi-Fi access points, which may connect to the Internet. While various embodiments are particularly useful with wireless networks, the embodiments are not limited to wireless networks and may also be implemented over wired networks with no changes to the methods. The wireless devices 102, 104 may also include a global positioning system (GPS) chip and receive transmissions from a GPS satellite 126 via a satellite data link. For example, the wireless devices 102, 104 may receive GPS coordinates (or GPS fix data), along with timestamp information, via the satellite data link when the GPS satellite's orbit brings it overhead.

In the wireless network system 100, the wireless devices 102, 104 may be multi-SIM wireless communication device that are capable of operating with a plurality of SIMs. For example, the wireless device 102 may be a dual-SIM wireless communication device. Using dual-SIM functionality, the wireless device 102 may access two core networks 120, 122 by camping on cells managed by base stations 106, 112. The core networks 120, 122 may be interconnected by public switched telephone network (PSTN) 124, across which the core networks 120, 122 may route various incoming and outgoing communications to the wireless device 102.

The wireless device 102 may make a voice or data call to a another device, such as the wireless device 104, using a service enabled by information stored in one of the SIMs, as well as the modem stack associated with that SIM, via the shared radio resource. The wireless device 102 may also receive a voice call or other data transmission from a third party in a similar manner. The third party device (e.g., wireless device 104) may be any of a variety of devices, including, but not limited to, a mobile phone, laptop computer, PDA, server, etc.).

Some or all of the wireless devices 102, 104 may be configured with multi-mode capabilities and may include one or more transceivers for communicating with different wireless networks over different wireless links/radio access technologies (RATs). For example, a DSDS wireless device 102 may be configured to camp two SIMs on cells of two different networks though the same transmit/receive chain (i.e., radio resource) and communicate over the two wireless networks on different subscriptions. As mentioned above, while techniques and embodiments are described herein using the example of a wireless device configured with at least one GSM subscription and one CDMA subscription, the embodiments may be extended to subscriptions on other radio access networks, such as cdma2000, UMTS, WCDMA, LTE, etc. Further, the techniques and embodiments described herein may be applied to multiple subscriptions that are on the same radio access network.

Figure 2:
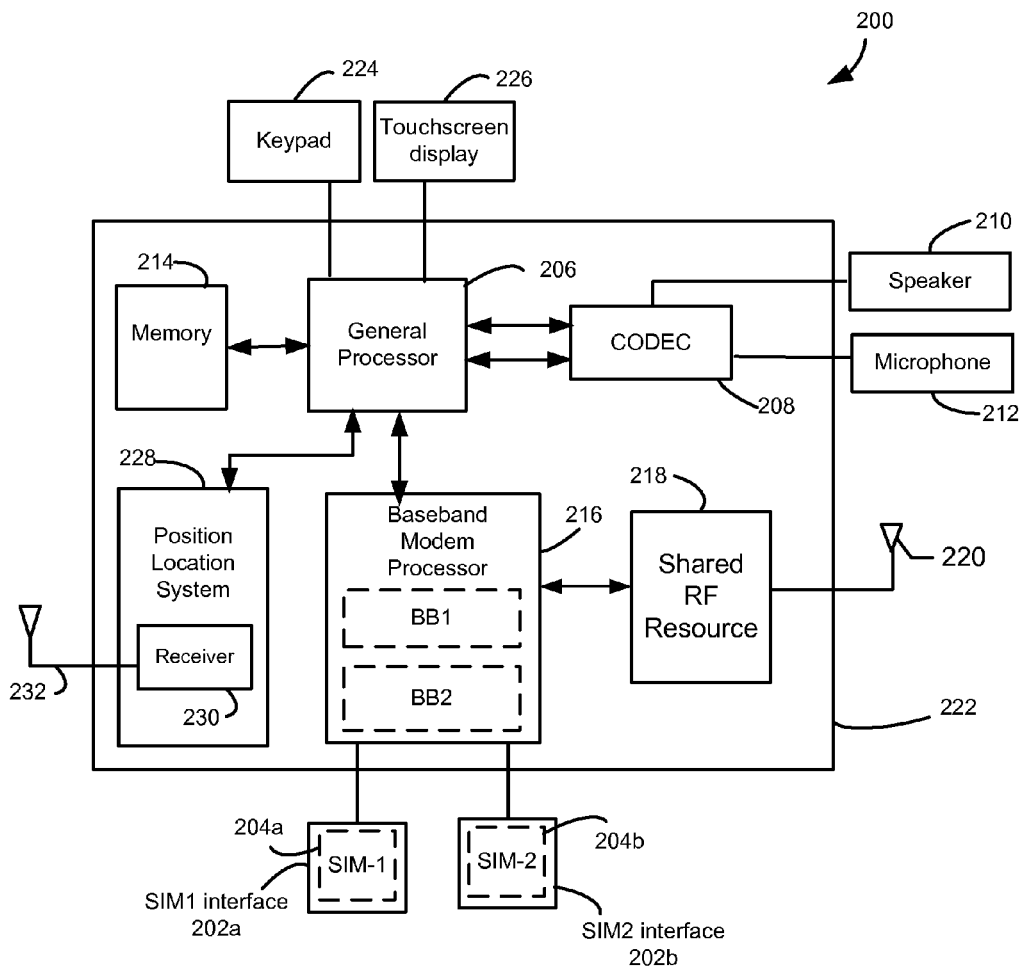
FIG. 2 is a component block diagram illustrating a dual-SIM dual standby wireless communication device according to various embodiments.

FIG. 2 is a functional block diagram of a multi-SIM wireless device 200 that is suitable for implementing various embodiments. According to various embodiments, the wireless device 200 may be similar to one or more of the wireless devices 102, 104 described above with reference to FIG. 1. With reference to FIGS. 1-2, such a wireless device 200 may include a first SIM interface 202a, which may receive a first identity module SIM-1 204a that is associated with a first subscription. The wireless device 200 may also include a second SIM interface 202b, which may receive a second identity module SIM-2 204b that is associated with a second subscription.

A SIM, in various embodiments, may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the wireless device, and thus need not be a separate or removable circuit, chip or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider, etc.

The wireless device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions.

The wireless device 200 may also include a position location system 228 coupled to the general processor 206. The position location system 228 (e.g., a GPS module) may contain a receiver 230 connected to an antenna 232 to receive signals (e.g., GPS signals) from a satellites in a navigation system (e.g., 126). The position location system 228 may also include control logic to control the desired functions of the receiver 230, as well as hardware and software for processing signals and performing calculations necessarily to determine position accordingly any of a variety of position location algorithms.

The general processor 206 and the memory 214 may each be coupled to at least one baseband modem processor 216. Each SIM in the wireless device 200 (e.g., SIM-1 202a and SIM-2 202b) may be associated with a baseband-RF resource chain, at least some components of which are shared by the SIMs. A baseband-RF resource chain may include the baseband modem processor 216, which may perform baseband/modem functions for communications by the SIMs, and a shared radio resource, referred to generally herein as a RF resource 218, which is coupled to an antenna 220 for sending and receiving RF signals. Some wireless devices may include more than one antenna 220. The RF resource 218 may perform transmit/receive functions for the SIMs of the wireless device as described herein. In some embodiments, the RF resource 218 may include separate transmit and receive circuitry, or may include a transceiver that combines transmitter and receiver functions.

A DSDS wireless device 200 may have a common baseband-RF resource chain for all SIMs in the wireless device (i.e., a single baseband modem processor 216, a single RF resource 218, and a single antenna 220). In some embodiments, different SIMs may be associated with separate baseband-RF resource chains that include physically or logically separate baseband modem processors (e.g., BB1, BB2), each of which may be coupled to a common (i.e., shared) RF resource 218.

In some embodiments, the general processor 206, memory 214, baseband modem processor(s) 216, and RF resource 218 may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between various software modules and functions in the wireless device 200 to enable communication between them, as is known in the art.

Figure 3:
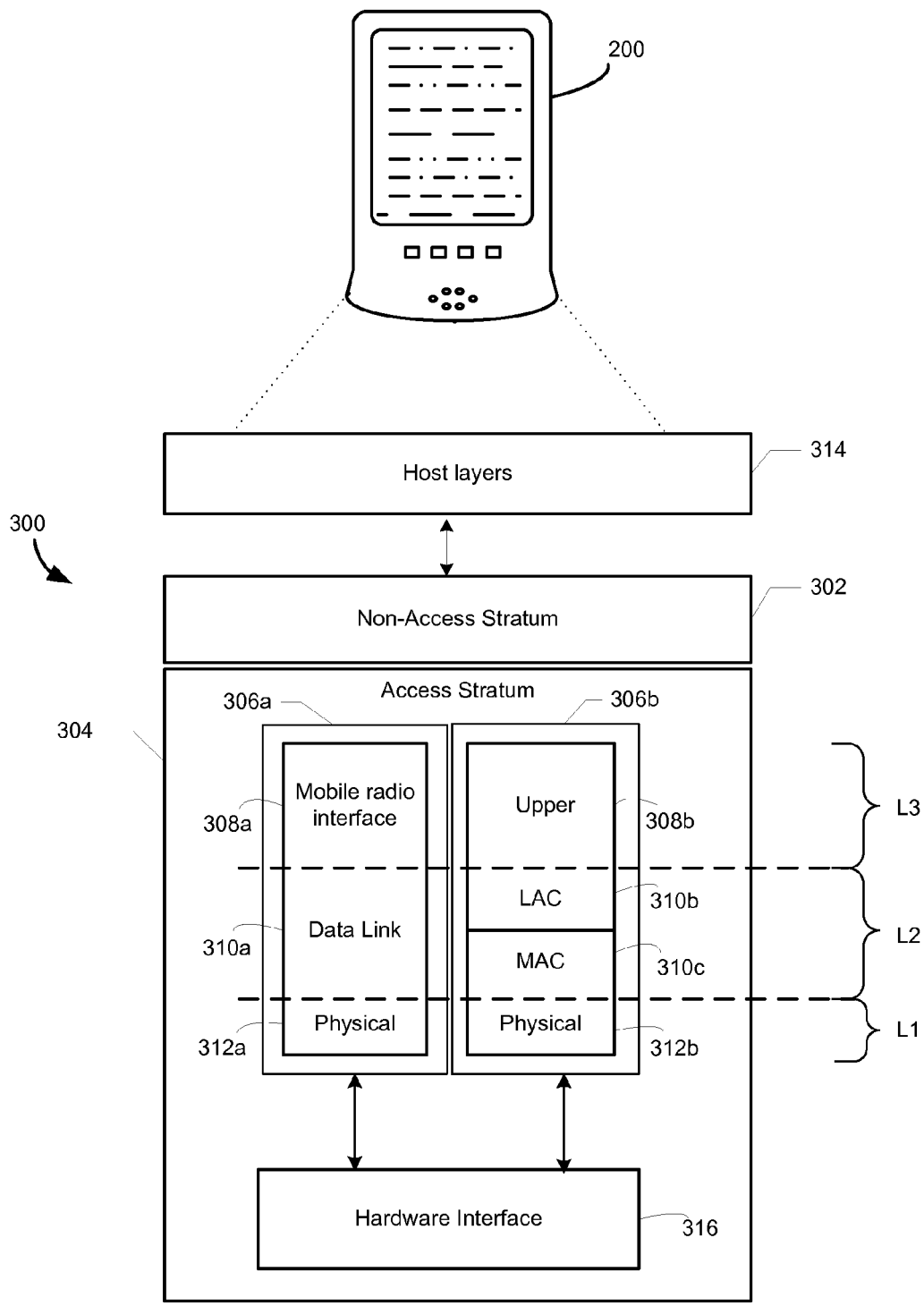
FIG. 3 is a system architecture diagram illustrating example protocol layer stacks implemented by the dual-SIM wireless communication device of FIG. 2.

Referring to FIG. 3, the wireless device 200 may have a layered software architecture 300 to communicate over access networks associated with SIMs. With reference to FIGS. 1-3, the software architecture 300 may be distributed among one or more processors, such as the baseband modem processor(s) 216. The software architecture 300 may also include a Non Access Stratum (NAS) 302 and an Access Stratum (AS) 304. The NAS 302 may include functions and protocols to support traffic and signaling between SIMs of the wireless device 200 and their respective core networks (e.g., 120, 122). The AS 304 may include functions and protocols that support communication between the SIMs and entities of their respective access networks (such as a mobile switching center (MSC)).

In a multi-SIM wireless communication device, such as the wireless device 200, the AS 304 may include multiple protocol stacks, each of which may be associated with a respective SIM. The protocol stacks may be implemented to allow modem operation using information provisioned on multiple SIMs. Therefore, a protocol stack that may be executed by a baseband modem processor is interchangeably referred to herein as a modem stack.

In some embodiments, the AS 304 may include protocol stacks 306a, 306b associated with the SIMs 204a, 204b, respectively. Although described below with reference to GSM-type and CDMA-type communication layers respectively, the protocol stacks 306a, 306b may support any of a variety of standards and protocols for wireless communications. The protocol stacks 306a, 306b may implement Layer 3 of GSM and CDMA signaling protocols, respectively. For example, such Layer 3 implementations may respectively include mobile radio interface layer 308a and upper layer 308b.

The mobile radio interface layer 308a of the protocol stack 306a may include at least one sublayer. For example, a connection management (CM) sublayers may manage call control functions for circuit-switched communications in the network, such as establishing, maintaining and releasing call connections for communications. The CM sublayer may also manage supplementary services and SMS communications.

Residing below the CM sublayer, a mobility management (MM) sublayer may support the mobility of user devices, and providing connection management services to the respective CM sublayer functions arising from mobility of the user, as well as authentication and security. Example functions of the mobility management sublayer may include provision of a MM connection, based on an existing radio resource connection, to the corresponding CM sub layer, location update procedures, and IMSI attach and detach procedures. Residing below the MM sublayer, a radio resource management (RR) sublayer may oversee the establishment of links between the wireless device 200 and associated access networks, including management of the frequency spectrum, channel assignment and handover, power-level control, and signal measurements. In various embodiments, the NAS 302 and RR layer may perform various functions to search for wireless networks and to establish, maintain and terminate calls.

In the protocol stack 306b, the upper layer 308b may include one or more sublayers that are involved in voice services, signaling services, and data services. In various embodiments, a voice services sublayer may control PSTN access, mobile-to-mobile voice services, and Internet telephony. A signaling services sublayer may include messages exchanged between the wireless device and base station to control call setup and teardown, handoffs, feature activation, system configuration, registration and authentication. The signaling services sublayer may also maintain call process states, such as an initialization state, idle state, system access state, and traffic channel state.

Residing below Layer 3, the protocol stacks 306a, 306b may implement Layer 2 of GSM and CDMA signaling protocols, respectively. Layer 2 of the protocol stack 306a may include a data link layer 310a to provide functions for handling incoming and outgoing data across the network, such as dividing output data into data frames and analyzing incoming data to ensure it has been successfully received. In some embodiments, the data link layer 310a may implement Link Access Procedure for the Dm-channel (LAPDm).

Layer 2 of the protocol stack 306b may be LAC sublayer 310b and MAC sublayer 310c. The LAC sublayer 310b may provide protocol support and control mechanisms for data transport services, manage point-to point communication channels between upper layer entities and provides framework to support a wide range of different end-to-end reliable link layer protocols. The LAC sublayer 310b may also provide correct delivery of signaling messages.

The MAC sublayer 310c may provide procedures for controlling the access of packet data and circuit data services to the physical layer, including contention control between multiple services from a single user, as well as between competing users in the wireless system. The MAC sublayer 310c may also perform mapping between logical channels and physical channels, and may control quality of service (QoS) and multiplexing of data from multiple sources onto single physical channels.

Residing below Layer 2, the protocol stacks 306a, 306b may implement Layer 1 of respective GSM and CDMA signaling protocols as physical layers 312a, 312b. The physical layers 312a, 312b may establish connections over the air interfaces and manage network resources for the wireless device 200.

While the protocol stacks 306a, 306b provide functions to transmit data through physical media, the software architecture 300 may further include at least one host layer 314 to provide data transfer services to various applications in the wireless device 200. In some embodiments, application-specific functions provided by the at least one host layer 314 may provide an interface between the protocol stacks 306a, 306b and the general processor 206. In other embodiments, the protocol stacks 306a, 306b may each include one or more higher logical layers (e.g., transport, session, presentation, application, etc.) that provide host layer functions. In some embodiments, the software architecture 300 may further include in the AS 304 a hardware interface 316 between the physical layers 312a, 312b and the communication hardware (e.g., one or more RF transceivers).

Separate units of the baseband-modem processor of the multi-SIM device may be implemented as separate structures or as separate logical units within the same structure, and may be configured to execute software including at least two protocol/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

A multi-SIM wireless device (e.g., 200) may receive communication services from base stations in multiple networks whose cell locations cover the wireless device, for example, GSM and CDMA networks. In some embodiments, a base station in a GSM network may transmit downlink signals to the wireless device using a 3GPP GERAN protocol. On each carrier, the base station may transmit a sequence of frames (e.g., a multiframe) with each frame having eight time slots.

The GSM standard employs a multiple access scheme that defines how simultaneous communication can occur between different wireless devices and base stations. Within each cell, a combination of frequency division multiple access (FDMA) and time division multiple access (TDMA) techniques are employed by the standard. Specifically, the available spectrum is divided into carrier frequencies of 200 kHz bandwidth, with pairs of carriers that are 45 MHz apart from each other identified by an absolute radio-frequency channel number (ARFCN). Each pair of carrier frequencies (one uplink, one downlink) is also divided into eight time slots (e.g., TS0 through TS7) using TDMA such that eight consecutive time slots form one TDMA frame, lasting approximately 4.615 ms. In this manner individual physical channels may be formed, each of which correspond to a particular carrier frequency and time slot number.

Logical channels may be mapped to the physical channels, and categorized by the information carried. Specifically, Traffic Channels (TCH) may carry speech or user data in a circuit switched or packet switched network, and control channels may carry signaling or synchronization data in a circuit switched or packet switched network. In various embodiments, a wireless communication device may be assigned one or more time slot indices for the duration of a call. User-specific data for each wireless communication device may be sent in TDMA frames used for the traffic channels, in the time slot(s) assigned to that wireless communication device. The beginning of a TDMA frame, i.e., the frame boundary time point, may be shifted between downlink and uplink to allow a wireless communication device to switch from one frequency to the other in the pair of carrier frequencies. Thus, a time slot of a particular channel may occur at different times on the uplink and downlink.

In some embodiments, a first SIM (e.g., 204a) may store information enabling it to register with a GSM network using the techniques described above. Once registered, the SIM may be allocated a time slot of a traffic channel for transmitting data to and receiving data from a base station. This allocation may be requested by the wireless device for a mobile originating call, or may be a result of responding to a paging request for mobile terminating call.

Figure 4:
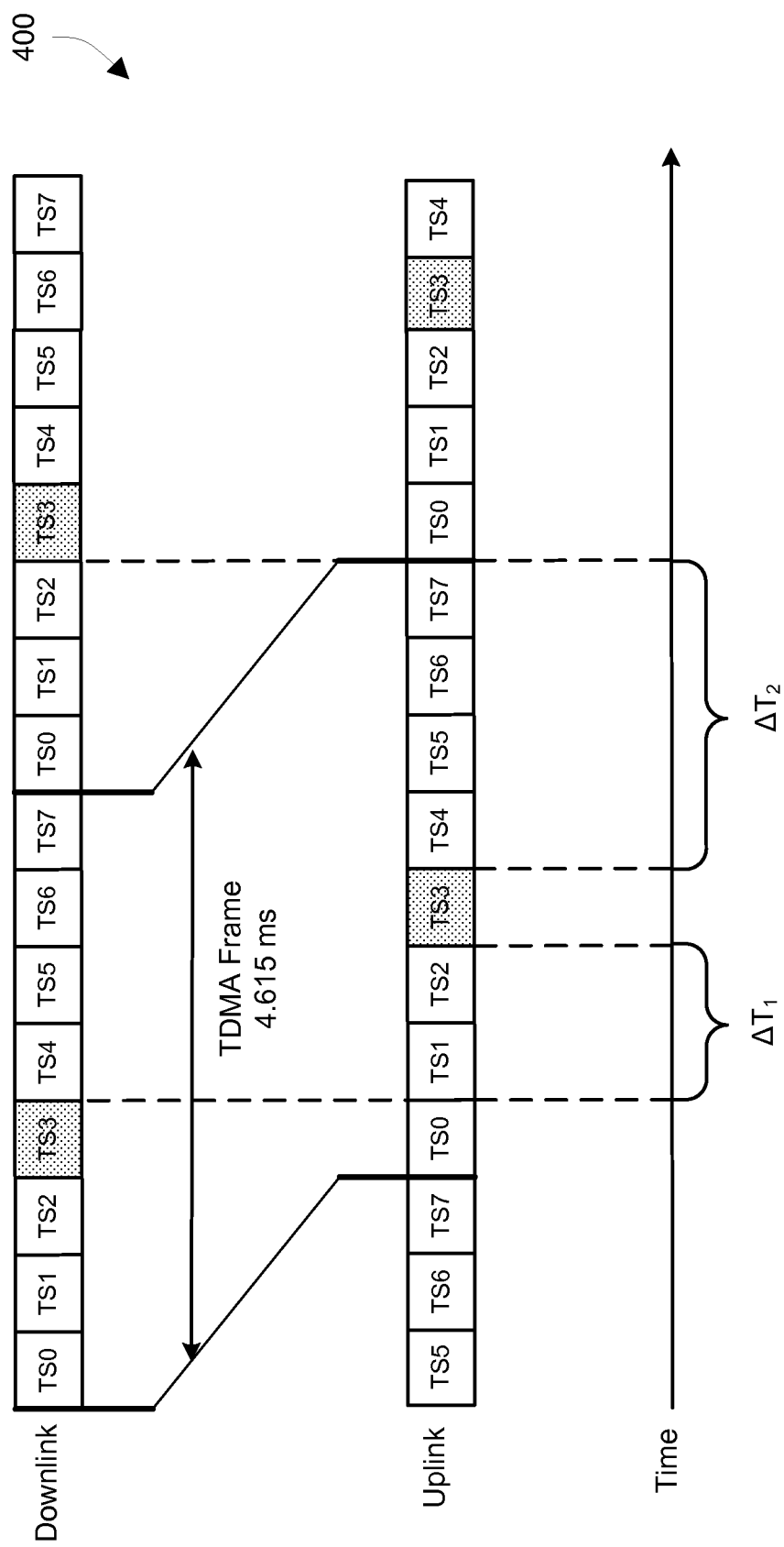
FIG. 4 is a diagram schematically illustrating an example time slot allocation in an active communication session for uplink and downlink frequencies of a TDMA frame.

FIG. 4 illustrates an example TDMA frame 400 of a traffic channel on uplink and downlink frequencies, which may be a representative frame of a traffic channel multiframe containing 26 TDMA frames. With reference to FIGS. 1-4, in the TDMA frame 400, the frame boundary time point is shown as time slot 0 (TS0), with time slot 3 (TS3) allocated to the first SIM. Therefore, the modem stack associated with the first SIM may only send and receive data during TS3 of the TDMA frame 400 and the other frames of the traffic channel multiframe. Consequently, the shared radio resource may not be used by the modem stack of the first SIM during time gaps $\Delta T_1$ and $\Delta T_2$ between TS3 on the uplink and downlink frequencies. In GSM, each time slot of the TDMA frame 400 lasts 576.9 μs, therefore $\Delta T_1$ lasts for 1.154 ms and $\Delta T_2$ lasts for 2.308 ms.

A wireless device processor (e.g., 206) may determine whether the duration of an upcoming time gap $\Delta T_1$ or $\Delta T_2$ will be greater than a preset minimum duration or threshold. If so, the radio resource may be utilized during that time to tune to a suitable frequency of another network (e.g., a CDMA network) to identify and receive information associated with maintaining service on that network. In some embodiments, the other network may be a CDMA network, in which case the suitable frequency may be in the 824-849 MHz band.

In CDMA systems, users share the same spectrum, each with a unique digital code to prevent interference. Input data is combined with spreading sequences, which include Walsh codes, short pseudorandom noise (PN) sequences, and long PN sequences, and transmitted as spread data streams. Conventional CDMA communications from a base station to a wireless device use forward channels in which different logical channels are assigned specific Walsh codes. Such logical channels include a pilot channel, a sync channel, paging channels, and traffic channels. Further, an individual sector area is assigned a particular base station by a short code PN offset (i.e., pilot PN offset). Therefore, a forward channel of a particular sector or base station may be uniquely identified by the short code PN offset of its sector, as well as a CDMA RF carrier frequency and a Walsh code that corresponds to the logical channel.

On the pilot channel, which uses Walsh code 0, a baseband sequence stream of zeros is spread by a pair of quadrature PN sequences. As a result, the sequence carried on the pilot channel is effectively a short code PN sequence (i.e., pilot PN sequence). The pilot PN sequence is transmitted continuously by each base station, with a different specified short code PN offset that uniquely identifies the sector from which the base station is transmitting the pilot signal. The pilot PN sequence is reused on the pilot channel in every cell with different short code PN offsets.

The sync channel, which uses Walsh code 32, carries a data stream of system identification and parameter information used by a wireless device during system acquisition. The sync channel uses the same pair of quadrature PN sequences and short code PN offset as the pilot channel. In addition to the short code PN offset, the sync channel also provides system time to the wireless device, the system identification number (SID), network identification number (NID), and additional information, including paging channel rates, base station protocol revision level, and channel number. Paging channels, which use Walsh codes 1-7, carry paging requests, as well as system parameters (e.g., SID, NID, system time, and short code PN offset). In each sector area, a base station may transmit, between one and seven paging channels according to capacity requirements. Traffic channels use any remaining Walsh codes subject to overall capacity as limited by noise, may be assigned to carry call traffic to individual users.

Figure 5A:
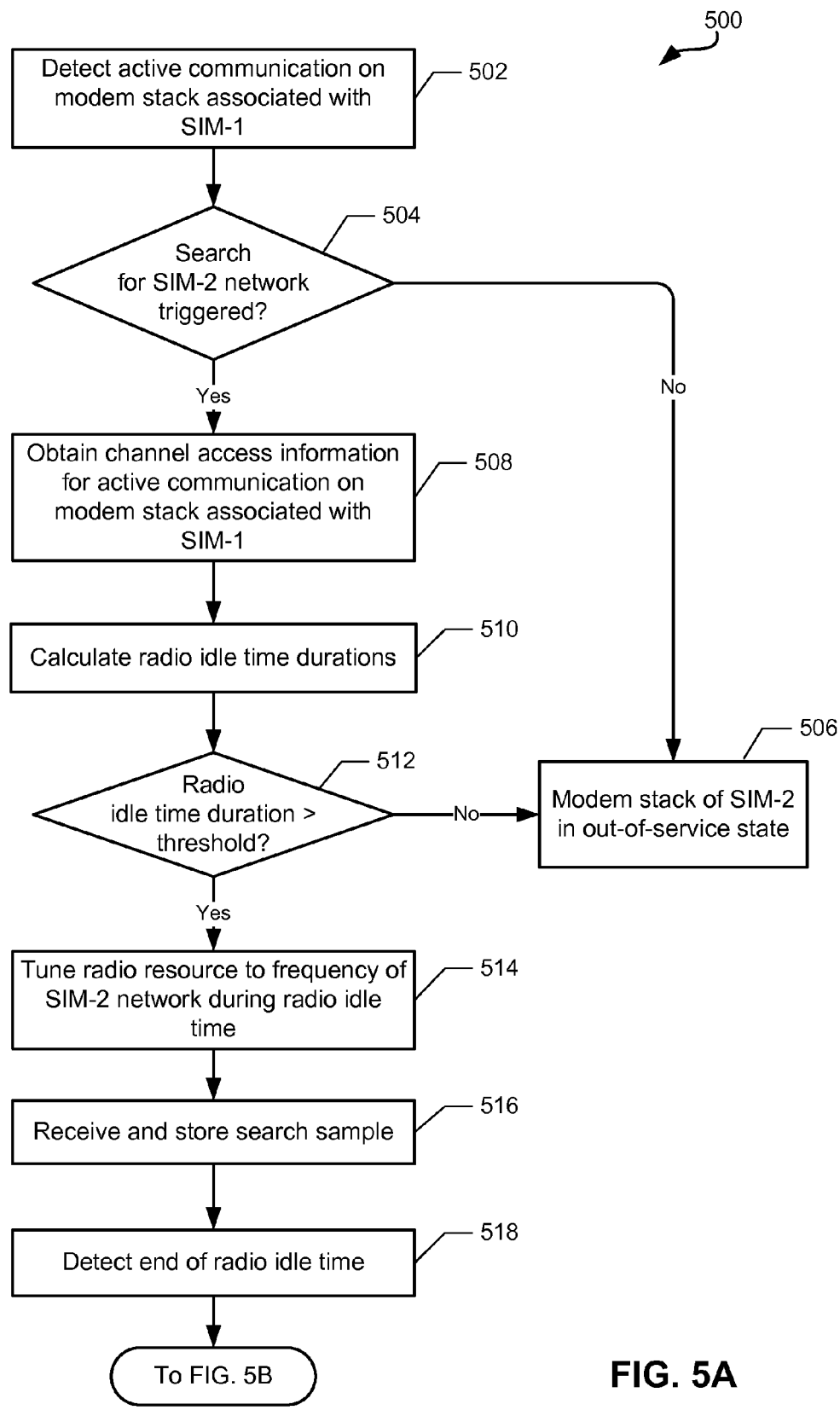
FIGS. 5A and 5B are process flow diagrams illustrating a method for using a time slot assignment by a first network to monitor information from a second network on a dual-SIM wireless communication device according to various embodiments of the disclosure.
Figure 5B:
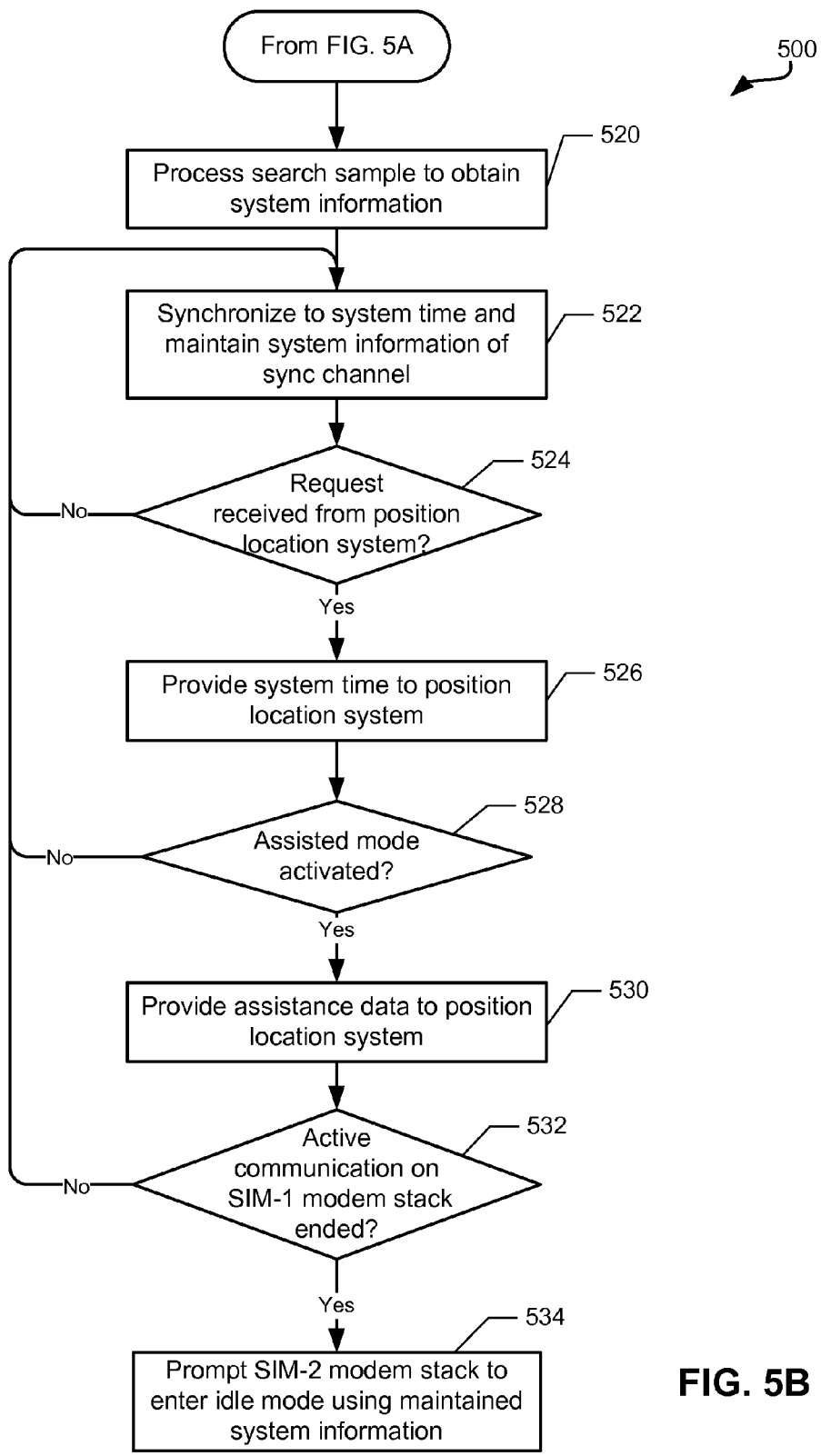

FIGS. 5A and 5B illustrate a method 500 of synchronizing with a network associated with one SIM while the modem stack associated with another SIM is in a dedicated mode using the shared resource (e.g., on an active call). With reference to FIGS. 1-4, in various embodiments, the operations of method 500 may be implemented by one or more processors of the wireless device 200, such as the general processor 206 and/or baseband modem processor(s) 216, or a separate controller (not shown) that may be coupled to memory and to the baseband modem processor(s) 216.

In block 502, the wireless device processor may detect that a modem stack associated with a first SIM ("SIM-1") has left idle mode and entered a dedicated mode (i.e., an active communication session) on a selected network. In various embodiments, the selected network may be a network that uses time division to share channels. For example, information stored on the first SIM may enable the associated modem stack to use a shared radio resource to send call setup requests to and receive paging requests from a GSM network base station.

In determination block 504, the wireless device processor may determine whether a condition exists that triggers a search for signals in a network associated with the second SIM ("SIM-2"). In some embodiments, the network associated with the second SIM may employ a radio access technology that is different than that of the network currently serving the first SIM modem stack. For example, information stored on the second SIM may enable the associated modem stack to use the shared radio resource to receive service in a CDMA system.

The search for signals in the network associated with the second SIM may be triggered based on a number of conditions or events. For example, a CDMA search may be triggered based on a wakeup timing of the slot cycle index (SCI) associated with the second SIM. Typically, a CDMA paging channel may be divided into cycles of time slots that are in multiples of 16, with each time slot lasting 80 ms. During idle mode operations, the modem stack associated with the second SIM may be configured to wake up and use the shared radio resource to monitor a CDMA paging channel during its assigned paging cycle time slot. The cycle period for the wake up may be set by an SCI value, and the cycle period duration may be computed by the formula: $T=16*2^{SCI}*80$ ms, where SCI is generally between 0 and 7. For example, if the SCI value is "0" the modem stack may be configured to wake up every 1.28 seconds (if SCI is "1" it may wake up every 2.56 seconds, etc.)

Thus, the larger an SCI value, the more power may be conserved in the idle mode, but with a longer time to page the associated SIM for an incoming call. The SCI value associated with the second SIM may be determined as the smaller of a preferred SCI value stored in the second SIM and a maximum SCI value broadcast in overhead messages on the paging channel by the base station. In addition to the idle mode procedures, a CDMA search in various embodiments may be regularly triggered after each SCI cycle period, the duration of which is based on the SCI value.

Additionally, a CDMA search may be triggered at points during the SCI cycle period based on a request for system information from other services on the wireless device, such as location-based services. For example, starting a navigation application on the wireless device may activate a GPS module, which may request CDMA system information from the wireless device processor.

In response to determining that no condition exists to trigger a search for signals in the network associated with the second SIM (i.e., determination block 504="No"), the second SIM modem stack may remain in an out-of-service state during the active call on the first SIM modem stack in block 506. In response to determining that a condition exists to trigger a search for signals in the network associated with the second SIM (i.e., determination block 504="Yes"), the wireless device processor may obtain channel access information for the active communication on the first SIM modem stack in block 508. For an example GSM network, such channel access information may identify a TDMA frame structure, and one or more time slots allocated to the first SIM modem stack for the active communication. Such channel access information may also identify an offset time between uplink and downlink frequencies. In some embodiments, the wireless device processor may access storage of the first SIM to obtain such information.

In block 510, the wireless device processor may calculate durations of time in which the radio resource is unused during the active communication of the first SIM modem stack (i.e., radio idle times). For example, in a GSM communication, the wireless device processor may utilize the obtained channel access information to count a number of continuous unused time slots between the assigned time slot(s) in uplink and downlink frequencies in TDMA frames, the total duration of which may be determined by multiplying the count by the duration of a single timeslot derived from the frame structure.

In determination block 512, the wireless device processor may determine whether the duration of any calculated radio idle time is or will be greater than a predetermined threshold duration. In some embodiments, the predetermined threshold duration may be provisioned by a service provider and stored on the second SIM, which may be accessed by the wireless device processor. In response to determining that no radio idle time has a duration that is or will be greater than the predetermined threshold (i.e., determination block 512="No"), the wireless device processor may return to block 506 and the second SIM modem stack may remain in an out-of-service state during the active communication.

In response to determining that the duration of a calculated radio idle time is or will be greater than the predetermined threshold (i.e., determination block 512="Yes"), the wireless device processor may grant control of the radio resource to the second SIM modem stack during that calculated radio idle time in block 514, thereby allowing the radio resource to tune to a frequency band of a network associated with the second SIM. For example, in a CDMA network, the radio resource may be tuned to forward link frequencies in the 869-894 MHz band. The radio resource may receive signal data during the radio idle time (i.e., a search sample), which may be stored by the wireless device processor in block 516. In an example CDMA network, the radio resource may receive signals transmitted on the forward link by nearby base stations of the network. The radio resource may be configured with a rake receiver in order to simultaneously receive signals from different base stations, which the wireless device processor may store in memory. In some embodiments, the storage of a search sample may be cumulative with the storage of previous search samples during the same active call. As the call proceeds on the first SIM modem stack, the search samples stored may add to or update existing data.

In block 518, the wireless device processor may determine that the end of the radio idle time is imminent and signal the radio resource to tune back to an uplink or downlink frequency for the next time slot for the active communication on the modem stack associated with the first SIM. The signal to the radio resource may be made sufficiently before the end of the radio idle time in order to permit the radio to be tuned to and settle on the uplink or downlink frequency.

Continuing to FIG. 5B, in block 520, the wireless device processor may process at least one stored search sample to obtain system information. For example, in a CDMA system, the wireless device processor may identify pilot signals by scanning one or more search samples using different short code PN offsets. Since, as discussed above, CDMA systems use a single pilot PN sequence, such scanning may involve correlating an internally generated PN sequence with different offset hypotheses until one or more pilot signals are identified based on the resulting signal energy. For example, short code PN offsets that result in energy peaks may be identified as pilot signals, while other offsets may result in little or no signal energy. In some embodiments, the wireless device processor may employ a searcher that is part of the radio resource to perform the correlations.

Using a short code PN offset resulting in a strong signal energy, the wireless device processor may decode a message of a corresponding sync channel from the search sample. In this manner, the wireless device processor may obtain system information, including, but not limited to, system time, CDMA frequency, network and system identifications, and paging channel rates, as well as short code PN offset.

In block 522, the wireless device processor may synchronize to the system time of the CDMA system, and may maintain system time, short code PN offset, and/or other system information read from the sync channel. As a result, when the active communication on the modem stack associated with the first SIM subsequently terminates, the second SIM modem stack may skip initial system acquisition operations by using the maintained system information, thereby avoiding having to use the radio resource to scan for pilot signals and decode sync channel messages. Also, maintaining system information may allow decoding of messages on the paging channel that may be subsequently received.

In determination block 524, the wireless device processor may determine whether a request for system information has been received from an application executing on the wireless device, such as a position location system or application. For example, a user application that requires location services, such as a navigation application, may be running on the wireless device and may activate the position location system through one or more APIs.

In some embodiments, the position location system may include one or more position receivers, which may be configured to communicate/share information with the wireless device processor. The position location system may be configured to determine the location of the wireless device by performing calculations on times of signal arrival to the position receiver.

In particular, the position location system, such as the position location system 228, may be a GPS module that includes a GPS receiver, such as the GPS receiver 230, configured to receive signals broadcast from orbiting satellites. Typically, reception of signals from at least three satellites is required to determine the location of a GPS receiver on the earth's surface (e.g., a two-dimensional position). Such signals may transmit messages that each include the time that the message was transmitted, and the position of the transmitting satellite at that time. The distance between the GPS receiver and each of the at least three satellites may be calculated by multiplying a propagation delay (i.e., difference between message transmission time and time of arrival) by the speed of light. Trilateration of the three distance calculations may be used to solve for unknown variables of the location fix and local time offset from GPS time. Thereafter, the GPS receiver may synchronize to the GPS system time to track satellite signals for that GPS session.

In some embodiments, such as when there is no prior knowledge of GPS satellite signals (i.e., a "cold start"), GPS system time may be determined based on another source, thereby requiring the GPS receiver to solve for only one unknown variable (i.e., the location fix). Since only two equations are needed to solve for one unknown variable, the GPS receiver may only need to receive signals from two satellites instead of three to determine a location fix, thereby speeding up the process. Given that CDMA system time is typically synchronous with the Universal Coordinated Time (UTC) that is used by GPS, in various embodiments signals received from a CDMA base station may be used as such other source of system time. Therefore, once activated, a GPS module or other position location system in various embodiments may trigger a request to the wireless device processor to obtain the CDMA system time. While described with reference to GPS, the position location system and receiver may support other satellite and/or terrestrial navigation protocols and systems.

In response to determining that a request for system information has not been received from a position location system (i.e., determination block 524="No"), the wireless device processor may return to block 522 to maintain the system information from the search sample. In response to determining that a request has been received from a position location system in the wireless device (i.e., determination block 524="Yes"), the wireless device processor may provide system time obtained from the one or more search sample to the position location system in block 526.

In some cases, the time it takes a position receiver (e.g., a GPS receiver) to acquire signals may be long or indefinite, such as due to large search space, obstruction of satellites, poor reception conditions, etc. As a result, the GPS receiver may provide little or no information to the position location system (e.g., a GPS module). As such, in some embodiments, externally sourced system information may be used as assistance data to augment or replace signals received from GPS satellites. In various embodiments, this assistance may be triggered by activation of an assisted mode on the wireless device.

In determination block 528, the wireless device processor may determine whether the assisted mode has been activated by the position location system. In response to determining that an assisted mode has not been activated by the position location system (i.e., determination block 528="No"), the wireless device processor may return to block 522 to maintain the system information from the one or more search sample.

In response to determining that an assisted mode has been activated by the position location system (i.e., determination block 528="Yes"), the wireless device processor may provide assistance data obtained from, or calculated based on, one or more search samples to the position location system in block 530 to allow assisted operation.

In some embodiments, the wireless device may be configured to use advanced forward link trilateration (AFLT), and the assistance data may include measurements of short code PN offsets of different pilot channels (i.e., pilot phase measurements). In such embodiments, the wireless device processor may measure phase differences of at least three different pilot signals identified in the search sample using short code PN offsets of the pilot PN sequence, and may provide such pilot phase measurements to the position location system in block 530. The position location system may be configured to access a base station almanac that provides cell sector identity information and cell sector location for each base station in the system.

Using the different pilot phase measurements and base station almanac entries, the position location system may estimate the distance between the wireless device and each base station, which may be converted to a two-dimensional position using trilateration. In some embodiments, a base station almanac may be stored in memory of the wireless device. In other embodiments, the position location system may send pilot phase measurements to a separate position determination entity in the network, which may access a base station almanac and perform the calculations to determine the two-dimensional position of the wireless device. In various embodiments the base station almanac may be stored in memory of the position determination entity, or may be accessed over an independent network connection.

In determination block 532, the wireless device processor may determine whether the active communication on the modem stack associated with the first SIM has ended. In response to determining that the active communication on the modem stack associated with the first SIM has not ended (i.e., determination block 532="No"), the wireless device processor may continue to maintain the system information from the search sample in block 522. In response to determining that the active communication on the modem stack associated with the first SIM has terminated (i.e., determination block 532="Yes"), the wireless device processor may prompt the modem stack associated with the second SIM to enter idle mode using the maintained system information in block 534. Thus, in contrast to conventional DSDS device is such circumstances, an embodiment wireless device will not need to perform the conventional system acquisition operations using the shared radio resource to reacquire service upon termination of the call on the other service.

As discussed above, the references to SIM-1 and SIM-2, as well as to a first network, second network, etc., are arbitrary, and may apply to either or any SIM and/or network of the wireless device.

Figure 6:
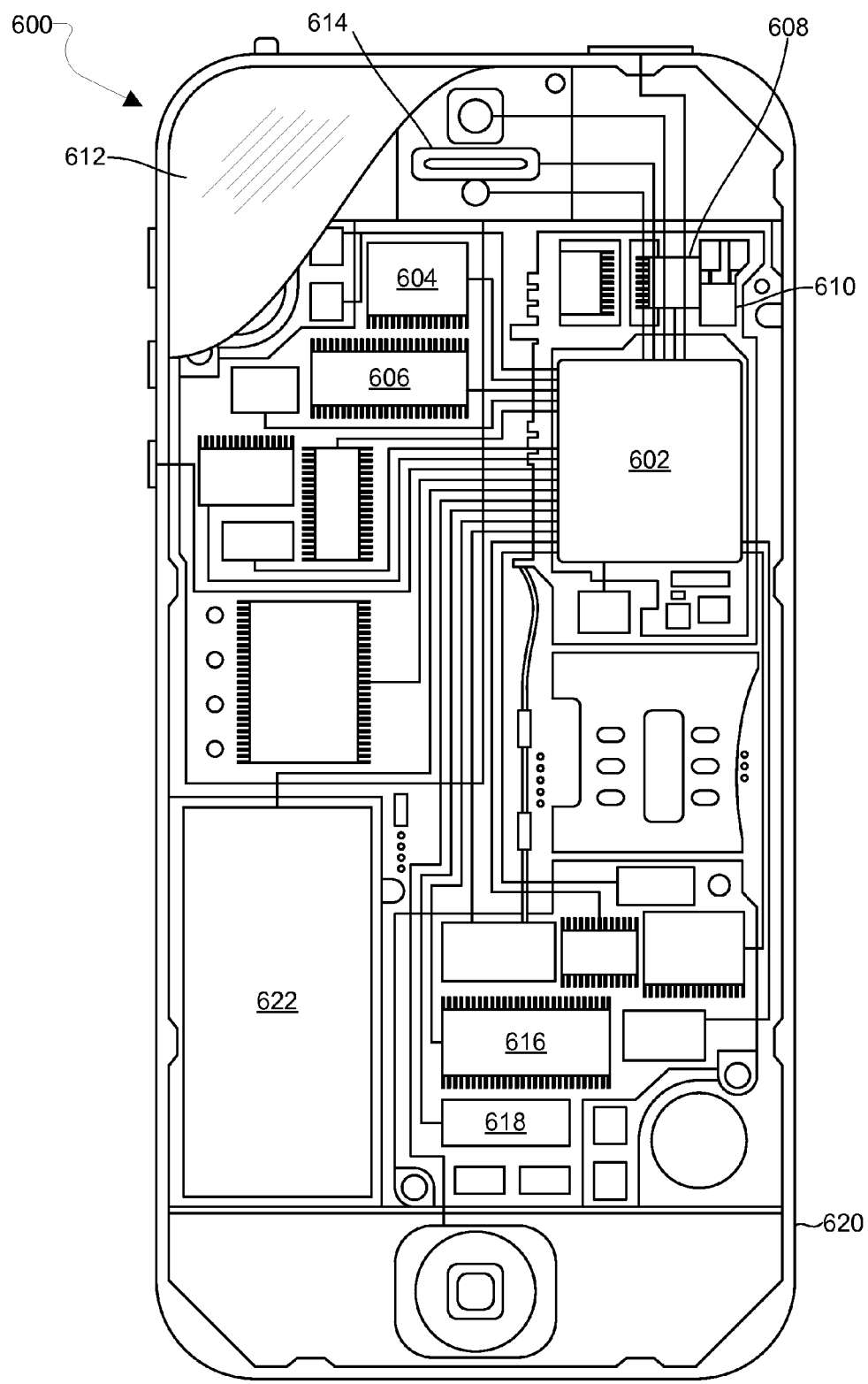
FIG. 6 is a component diagram of an example wireless device suitable for use with various embodiments of the disclosure.

Various embodiments may be implemented in any of a variety of multi-SIM wireless devices, an example of which is illustrated in FIG. 6. For example, a wireless device 600 may include a processor 602 coupled to a touchscreen controller 604 and an internal memory 606. The processor 602 may be one or more multicore ICs designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may include a cellular network wireless modem chip 616 coupled to the processor 602 that enables communication with two or more cellular networks via a shared radio resource 608 and antennae 610.

The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

The processors 602 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 606 before they are accessed and loaded into the processors 602. Processors 602 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602, including internal memory or removable memory plugged into the device and memory within the processor 602 themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit various embodiments to a particular order, sequence, type of network or carrier.

Various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of maintaining synchronization with networks on a wireless communication device having at least a first subscriber identification module (SIM) and a second SIM sharing a single radio resource, comprising:
   detecting an active communication session on a modem stack associated with the first SIM, wherein at least one time slot of a channel is allocated to the active communication session by a network associated with the first SIM;
   determining whether a condition exists that triggers a search for signals in a network associated with the second SIM;
   calculating radio idle time periods within the active communication session in response to determining that a condition exists that triggers the search for signals in the network associated with the second SIM;
   determining whether a radio idle time period within the active communication session will exceed a predetermined threshold duration; and
   in response to determining that a radio idle time period within the active communication session will exceed the predetermined threshold duration:
      tuning the radio resource to a frequency of the network associated with the second SIM upon initiation of the radio idle time period;
      receiving a search sample comprising signals transmitted by the network associated with the second SIM;
      storing the search sample; and
      tuning the radio resource to a frequency corresponding to the active communication session before expiration of the radio idle time period.

2. The method of claim 1, further comprising performing offline processing on the stored search sample after expiration of the radio idle time period, wherein performing offline processing comprises:
   identifying pilot signals in the search sample based on phase comparison with possible pseudo-noise (PN) offsets and resulting signal energy measurements;
   selecting a PN offset resulting in a strong signal energy;
   decoding a message from the stored search sample using the selected PN offset, wherein the message includes system information and system time reported by the network associated with the second SIM;
   synchronizing to the system time of the network associated with the second SIM; and
   maintaining the system information.

3. The method of claim 2, wherein performing offline processing further comprises:
   determining whether a request for information has been received from a position location system in the wireless communication device;
   providing the system time of the network associated with the second SIM to the position location system in response to determining that a request for information has been received from the position location system;
   determining whether an assisted mode has been activated by the position location system; and
   providing assistance data to the position location system in response to determining that the assisted mode has been activated.

4. The method of claim 3, wherein the assistance data comprises pilot phase measurements derived from PN offsets of a plurality of pilot signals identified within the stored search sample, wherein the assisted mode of the position location system is configured to implement advanced forward link trilateration (AFLT) using the pilot phase measurements.

5. The method of claim 2, further comprising:
   detecting termination of the active communication session on the modem stack associated with the first SIM; and
   using the maintained system information to enter idle mode on the modem stack associated with the second SIM.

6. The method of claim 1, wherein calculating radio idle time periods comprises:
   accessing information that identifies the at least one time slot allocated to the active communication session, a frame structure of the channel in the network associated with the first SIM, and an offset time between uplink and downlink frequencies of the channel in the network associated with the first SIM;
   counting continuous time slots between the at least one time slot allocated to the active communication session for the uplink and downlink frequencies; and
   multiplying the count of continuous time slots by a time slot duration derived from the frame structure.

7. The method of claim 1, wherein the condition that triggers the search for signals in the network associated with the second SIM comprises one or more of:
   occurrence of a time slot in which the modem stack associated with the second SIM is configured to wake up from an idle mode to monitor a paging channel of the network associated with the second SIM;

receipt of a request for information from a position location system of the wireless communication device; and
notification that an assisted mode has been activated by the position location system.

8. The method of claim 1, wherein:
the network associated with the first SIM comprises a first network; and
the network associated with the second SIM comprises a second network different from the first network.

9. The method of claim 8, wherein:
the first network comprises a GSM network; and
the second network comprises a CDMA network.

10. A wireless communication device, comprising:
a radio resource associated with a first subscriber identification module (SIM) and a second SIM; and
a processor coupled to the first and second SIMs and the radio resource, wherein the processor is configured to:
  detect an active communication session on a modem stack associated with the first SIM, wherein at least one time slot of a channel is allocated to the active communication session by a network associated with the first SIM;
  determine whether a condition exists that triggers a search for signals in a network associated with the second SIM;
  calculate radio idle time periods within the active communication session in response to determining that a condition exists that triggers the search for signals in the network associated with the second SIM;
  determine whether a radio idle time period within the active communication session will exceed a predetermined threshold duration; and
  in response to determining that a radio idle time period within the active communication session will exceed the predetermined threshold duration:
    tune the radio resource to a frequency of the network associated with the second SIM upon initiation of the radio idle time period;
    receive a search sample comprising signals transmitted by the network associated with the second SIM;
    store the search sample; and
    tune the radio resource to a frequency corresponding to the active communication session before expiration of the radio idle time period.

11. The wireless communication device of claim 10, wherein the processor is further configured to perform offline processing on the stored search sample after expiration of the radio idle time period, and wherein the processor is configured to:
identify pilot signals in the search sample based on phase comparison with possible pseudo-noise (PN) offsets and resulting signal energy measurements;
select a PN offset resulting in a strong signal energy;
decode a message from the stored search sample using the selected PN offset, wherein the message includes system information and system time reported by the network associated with the second SIM;
synchronize to the system time of the network associated with the second SIM; and
maintain the system information.

12. The wireless communication device of claim 11, wherein the processor is further configured to:
determine whether a request for information has been received from a position location system in the wireless communication device;
provide the system time of the network associated with the second SIM to the position location system in response to determining that a request for information has been received from the position location system;
determine whether an assisted mode has been activated by the position location system; and
provide assistance data to the position location system in response to determining that the assisted mode has been activated.

13. The wireless communication device of claim 12, wherein:
the assistance data comprises pilot phase measurements derived from PN offsets of a plurality of pilot signals identified within the stored search sample, wherein the assisted mode of the position location system is configured to implement advanced forward link trilateration (AFLT) using the pilot phase measurements.

14. The wireless communication device of claim 11, wherein the processor is further configured to:
detect termination of the active communication session on the modem stack associated with the first SIM; and
use the maintained system information to enter idle mode on the modem stack associated with the second SIM.

15. The wireless communication device of claim 10, wherein the processor is configured to:
access information that identifies the at least one time slot allocated to the active communication session, a frame structure of the channel in the network associated with the first SIM, and an offset time between uplink and downlink frequencies of the channel in the network associated with the first SIM;
count continuous time slots between the at least one time slot allocated to the active communication session for the uplink and downlink frequencies; and
multiply the count of continuous time slots by a time slot duration derived from the frame structure.

16. The wireless communication device of claim 10, wherein the condition that triggers the search for signals in the network associated with the second SIM comprises one or more of:
occurrence of a time slot in which the modem stack associated with the second SIM is configured to wake up from an idle mode to monitor a paging channel of the network associated with the second SIM;
receipt of a request for information from a position location system of the wireless communication device; and
notification that an assisted mode has been activated by the position location system.

17. The wireless communication device of claim 10, wherein:
the network associated with the first SIM comprises a first network; and
the network associated with the second SIM comprises a second network different from the first network.

18. The wireless communication device of claim 17, wherein the first network comprises a GSM network and the second network comprises a CDMA network.

19. A wireless communication device, comprising:
means for detecting an active communication session on a modem stack associated with a first subscriber identification module (SIM), wherein at least one time slot of a channel is allocated to the active communication session by a network associated with the first SIM;
means for determining whether a condition exists that triggers a search for signals in a network associated with a second SIM, wherein the first and second SIMs are both associated with a radio resource;
means for calculating radio idle time periods within the active communication session in response to determining that a condition exists that triggers the search for signals in the network associated with the second SIM;

means for determining whether a radio idle time period within the active communication session will exceed a predetermined threshold duration; and means for tuning the radio resource to a frequency of the network associated with the second SIM upon initiation of the radio idle time period in response to determining that a radio idle time period within the active communication session will exceed the predetermined threshold duration;

means for receiving a search sample comprising signals transmitted by the network associated with the second SIM;

means for storing the search sample; and means for tuning the radio resource to a frequency corresponding to the active communication session before expiration of the radio idle time period.

20. A non-transitory processor-readable medium having stored thereon processor-executable instructions configured to cause a wireless communication device processor to perform operations comprising:
   detecting an active communication session on a modem stack associated with a first subscriber identification module (SIM), wherein at least one time slot of a channel is allocated to the active communication session by a network associated with the first SIM;
   determining whether a condition exists that triggers a search for signals in a network associated with a second SIM, wherein the first and second SIMs are both associated with a radio resource;
   calculating radio idle time periods within the active communication session in response to determining that a condition exists that triggers the search for signals in the network associated with the second SIM;
   determining whether a radio idle time period within the active communication session will exceed a predetermined threshold duration; and
   in response to determining that a radio idle time period within the active communication session will exceed the predetermined threshold duration:
      tuning the radio resource to a frequency of the network associated with the second SIM upon initiation of the radio idle time period;
      receiving a search sample comprising signals transmitted by the network associated with the second SIM;
      storing the search sample; and
      tuning the radio resource to a frequency corresponding to the active communication session before expiration of the radio idle time period.

21. The non-transitory processor-readable medium of claim 20, wherein the stored processor-executable instructions are configured to cause the wireless communication device processor to perform operations further comprising performing offline processing on the stored search sample after expiration of the radio idle time period, and
   wherein the stored processor-executable instructions are configured to cause the wireless communication device processor to perform operations such that performing offline processing comprises:
      identifying pilot signals in the search sample based on phase comparison with possible pseudo-noise (PN) offsets and resulting signal energy measurements;
      selecting a PN offset resulting in a strong signal energy;
      decoding a message from the stored search sample using the selected PN offset, wherein the message includes system information and system time reported by the network associated with the second SIM;
      synchronizing to the system time of the network associated with the second SIM; and
      maintaining the system information.

22. The non-transitory processor-readable medium of claim 21, wherein the stored processor-executable instructions are configured to cause the wireless communication device processor to perform operations such that performing offline processing further comprises:
   determining whether a request for information has been received from a position location system in the wireless communication device;
   providing the system time of the network associated with the second SIM to the position location system in response to determining that a request for information has been received from the position location system;
   determining whether an assisted mode has been activated by the position location system; and
   providing assistance data to the position location system in response to determining that the assisted mode has been activated.

23. The non-transitory processor-readable medium of claim 22, wherein:
   the assistance data comprises pilot phase measurements derived from PN offsets of a plurality of pilot signals identified within the stored search sample, wherein the assisted mode of the position location system is configured to implement advanced forward link trilateration (AFLT) using the pilot phase measurements.

24. The non-transitory processor-readable medium of claim 21, wherein the stored processor-executable instructions are configured to cause the wireless communication device processor to perform operations further comprising:
   detecting termination of the active communication session on the modem stack associated with the first SIM; and
   using the maintained system information to enter idle mode on the modem stack associated with the second SIM.

25. The non-transitory processor-readable medium of claim 20, wherein the stored processor-executable instructions are configured to cause the wireless communication device processor to perform operations such that calculating radio idle time periods comprises:
   accessing information that identifies the at least one time slot allocated to the active communication session, a frame structure of the channel in the network associated with the first SIM, and an offset time between uplink and downlink frequencies of the channel in the network associated with the first SIM;
   counting continuous time slots between the at least one time slot allocated to the active communication session for the uplink and downlink frequencies; and
   multiplying the count of continuous time slots by a time slot duration derived from the frame structure.

26. The non-transitory processor-readable medium of claim 20, wherein the stored processor-executable instructions are configured to cause the wireless communication device processor to perform operations such that the condition that triggers the search for signals in the network associated with the second SIM comprises one or more of:
   occurrence of a time slot in which the modem stack associated with the second SIM is configured to wake up from an idle mode to monitor a paging channel of the network associated with the second SIM;
   receipt of a request for information from a position location system of the wireless communication device; and notification that an assisted mode has been activated by the position location system.

27. The non-transitory processor-readable medium of claim 20, wherein:
the network associated with the first SIM comprises a first network; and
the network associated with the second SIM comprises a second network different from the first network.

28. The non-transitory processor-readable medium of claim 27, wherein:
the first network comprises a GSM network; and
the second network comprises a CDMA network.

* * * * *